United States Patent Office 2,995,468
Patented Aug. 8, 1961

2,995,468
GLAZE AND ENAMEL COMPOSITIONS INCLUDING LITHIUM FLUOSILICATE AND METHOD OF MAKING THEM
Leonard W. Steiger, Hackensack, N.J., assignor to Stepan Chemical Co., Maywood, N.J., a corporation of Delaware
No Drawing. Filed Mar. 22, 1960, Ser. No. 16,650
12 Claims. (Cl. 117—70)

The present invention relates to glaze and enamel compositions including lithium fluosilicate and to a method of making them. More particularly, the present invention relates to such compositions and methods of making them wherein it is desired, in the case of glazes, to produce surface coatings for ceramic bodies which will be perfect in that they are not marred by blebs or craters, wherein the surface has a high brilliance or reflectivity, and particularly wherein the glaze has a coefficient of expansion lower than that of the ceramic body onto which it is applied. In the case of enamels, all of these same objects with the exception of the matter of coefficient of expansion are similarly attained by the present invention. In enamels it is often desired that the enamel be opaque in character. In such instances, the present invention lends itself well to maintaining this opacity, even in relatively thin films or layers.

The essential feature of the present invention is the use of the compound lithium fluosilicate ($Li_2SiF_6$) as such instead of any or all of the constituent elements of this compound in other compositions or relationships, it being recognized that the use of lithium compounds such as lithium carbonate has been previously known in products of the kind to which the present invention relates. The same may be said of fluorine compounds and certainly it is obvious that the presence of silicon in the form of silica is a well known constituent of many types of ceramic materials. Notwithstanding that the constituent elements are individually old, it has been discovered and is the basis of the present invention that certain peculiar and unexpected results of a desirable nature are attained by the use of lithium fluosilicate in glazes and enamels, certain of these results having been mentioned hereinabove.

The following symbolic diagrams illustrate two embodiments of the invention:

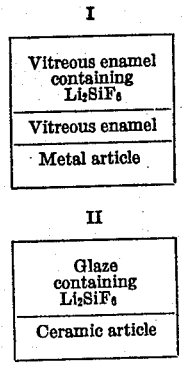

Summarizing the present invention, therefore, it comprises adding to glaze and enamel compositions from about ½% to 5% by weight of lithium fluosilicate, the percent being based upon the total of the oxides present in the finished product, it being assumed for purposes of this invention that the ceramic materials including the glazes and enamels of the present invention may be considered as solid solutions or other more or less homogeneous solid mixtures of a plurality of ceramic oxides in each instance.

It has been found that the basic composition of glazes and enamels other than the lithium fluosilicate, which particularly characterizes the present invention, comprises one or more materials of each of two particular groups as now to be set out.

The first group is a material capable of itself forming a glass, which is selected from the group consisting of $SiO_2$, $B_2O_3$, $As_2O_5$, $As_2O_3$, $BeO_3$, $Bi_2O_3$, $GeO_2$, $P_2O_5$, $Sb_2O_5$, $Sb_2O_3$, $Ta_2O_5$, and $V_2O_5$. These materials are all known as glass forming oxides, and no invention is predicated per se upon the use of any one or more of these materials.

There should also be present in any composition according to the present invention at least one network modifier material selected from the group consisting of $Me'_2O$ and $Me''O$; wherein $Me'$ is a metal selected from the group consisting of K, Na, Li, Rb and Cs, and wherein $Me''$ is a metal selected from the group consisting of Ca, Sr, Ba, Mg, Mn, Pb and Zn. Again, no invention is predicated per se upon the use of any one or more of these materials as network modifiers in ceramic glass compositions.

In the case of glazes, the invention comprises the use of lithium fluosilicate, within the limits hereinabove set forth, and so as to provide some or all of the advantages set forth, and particularly to provide for a relatively low coefficient of expansion in the final glaze as matured onto the finished article.

It is known, for example, that a glaze, which is one kind of a glass, is approximately eight to ten times as strong in compression as in tension. It is further known that in the case of glazed articles, for example, tile, dinnerware, sanitary ware and electrical porcelain, a mechanical failure of the final article generally starts from the surface of the glazed body. In order to minimize such mechanical failure of the glaze, it is desired that the glaze coating on the ceramic body be in compression. In order to attain this desired condition, it being recognized that the glaze must be matured while both it and the ceramic body are heated to a relatively high temperature, it is necessary that the glaze per se have a coefficient of expansion somewhat less than that of the body itself, so that upon cooling, the glaze will be under compression even though the ceramic body onto which the glaze is applied, is strain-free.

In any event, it is necessary from a practical commercial point of view to provide a glaze having a lower coefficient of expansion than that of the ceramic bodies onto which it may be applied. Thus, for example, a ceramic body may have a coefficient of expansion of $5.8 \times 10^{-6}$. If the glaze were to have the same coefficient of expansion, it could not be placed under compression incident to the cooling of the body and its glaze. It has been found, for example, that with the same base glaze composition, a desired lower coefficient of expansion can be attained using lithium fluosilicate than could otherwise be attained while retaining other desired properties in the glaze.

From the point of view of the manufacturer of ceramic articles of this kind, the temperature at which a glaze matures is also highly important, in that the lower this temperature, the cheaper his manufacturing operation, as it may be carried out using less heat and with less wear and tear on equipment, etc., in that kilns and the like last longer at lower temperatures.

It is also found that the practice of the present invention results in a substantial reduction of blebs (i.e. blisters incident to the presence of gaseous bubbles within the enamel or glaze coating) and provides a smoother, glossier and more brilliant surface in general than could be provided following prior art practices and by the use of prior art compositions. It has also been found that the mechanical hardness and durability of surfaces of enamels and glazes according to the present invention are substantially superior to those attainable by prior art compositions and other methods. All this will be apparent in greater detail from a number of examples hereinafter given.

Another desirable result of the present invention, which is common to both glazes and enamels, is the enhancement of resistance of the surface to acid attack. It has been known for some time that this resistance can be increased by increasing the silica content. However, if silica alone is increased, and other elements of the composition remain generally unchanged, except as they are proportioned to compensate for the increased silica, it is found that other characteristics of the final products such, for example, as coefficient of thermal expansion and viscosity at a given temperature, are varied in an undesired manner and to an undesired degree. However, when silica is in effect increased by introducing silica as such or in the form of silicates and lithium fluosilicate is added according to the present invention, the desirable results of increased acid resistance are attained, without at the same time causing undesired changes in other properties of the product. It has further been found that more silica can be introduced as such without increasing the maturing temperature of the resulting composition due to potent fluxing activity of lithium fluosilicate.

The present invention involves the surprising discovery that lithium fluosilicate is much more effective in ways and to the extent that the distinctions are really distinctions of kind, rather than of degree, all as constrasted with the nearest corresponding alkali metal fluosilicate, i.e. sodium fluosolicate. For example, in glazes lithium fluosilicate has been found to reduce the maturation temperature about two or three times as much as an equivalent amount by weight of sodium fluosilicate. The viscosity of the lithium fluosilicate-containing glaze is markedly lower than that of the comparable sodium fluosilicate-containing glaze; this has been shown in the inclined-plane type of viscosity measurement at sub-maturing tempertures and may also be demonstrated in other types of high temperature-viscosity evaluations near or at the maturing temperature of the glaze. The lower viscosity of the lithium fluosilicate glaze permits the glaze to free itself of blebs and also of surface craters and other micro-defects on the surface prior to the glaze becoming rigid upon cooling. The lithium fluosilicate markedly reduces the glaze viscosity, so that this glaze has a much smoother and more brilliant surface, and possesses higher gloss and higher reflectivity than the same type of glaze containing sodium fluosilicate. This also will be set out in greater detail in examples hereinafter given.

In a similar way, lithium fluosilicate has been found superior to the presence of lithium fluoride introduced into the composition as such, even through the composition in each instance already contained silica. Similarly, lithium oxide (introduced into the composition in the form of lithium carbonate) is not nearly as effective, even though the composition contained another fluoride as well as silica.

The reasons behind the superiority in the use of lithium fluosilicate are not fully understood, particularly as contrasted with another alkali fluosilicate, for example, sodium fluosilicate or as contrasted with compositions otherwise including all the ingredient elements lithium, silicon and fluorine—supplied in some other chemical compounds.

Substantially the same characteristics and advantages are present in the case of enamels as in the case of glazes, except that in the case of enamels the coefficient of expansion is important in a somewhat different way. In the usual case, the coefficient of expansion of most metals which may be used as bases for enameled bodies is greater, and in some instances substantially greater, than the coefficient of expansion of any composition usable as an enamel. In many instances it has been found necessary to provide a ground coat, or possibly several such coats, which is disposed intermediate the metal in the one hand and the outer surface coating of enamel, to which the present invention particularly pertains. In the case of these one or more intermediate coats, they are not only located intermediate the metal and the outer coat of enamel; but also they are so arranged in composition as to have a coefficient of expansion intermediate between that of the metal used on the one hand, and the coefficient of expansion of the final outer coating of enamel on the other. This is a usual, even if not the universal, practice in this art.

In the case of enamels, while the outside limits of use of lithium fluosilicate may be taken as the same as in the case of glazes, and the inner preferred limits of an inner preferred range may also be the same; and further, a preferred composition may be substantially the same as to lithium fluosilicate; yet it is known and feasible that higher values within a given range of lithium fluosilicate content may be peculiarly adapted for use as enamels as compared with the lower values within this range. In fact, there are some instances where up to 8% or 10% of lithium fluosilicate may be used in case of enamels, even through this is believed unlikely from a commercial point of view, in view of the relatively high cost of lithium fluosilicate as compared with the other ingredients of the enamel composition.

The present invention is more clearly demonstrated in its various phases by certain examples which follow.

*Example 1*

This example is given to illustrate the comparison of a base glaze composition, using various amounts of lithium fluoride on the one hand as representative of the prior art; and the same base glaze composition combined with different amounts of lithium fluosilicate as representative of compositions according to the present invention.

The base glaze composition is as follows:

| Oxide Ingredient | Empirical Molecular Formula | Weight Proportion, Percent |
|---|---|---|
| $K_2O$ | 0.1 | 2.44 |
| $Na_2O$ | 0.1 | 1.61 |
| CaO | 0.1 | 1.45 |
| PbO | 0.7 | 40.47 |
| $Al_2O_3$ | 0.2 | 5.28 |
| $B_2O_3$ | 0.2 | 3.61 |
| $SiO_2$ | 2.9 | 45.14 |

When this base glaze used alone (i.e. without addition of any other material) was tested for coefficient of thermal expansion in the range of 75° F. to 750° F. it was found to be $5.4 \times 10^{-6}$. With various additions to this same base glaze composition, the coefficient of thermal expansion was found to be as follows:

| Addition | Resulting Coefficient of Thermal Expansion |
|---|---|
| 1% LiF | $5.6 \times 10^{-6}$ |
| 2% LiF | $5.8 \times 10^{-6}$ |
| 1% $Li_2SiF_6$ | $5.4 \times 10^{-6}$ |
| 2% $Li_2SiF_6$ | $5.5 \times 10^{-6}$ |

If this glaze, with the several additions noted, were used respectively with a ceramic body having a coefficient of thermal expansion of $5.8 \times 10^{-6}$, it will be seen that the coefficient of thermal expansion of the base glaze is sufficiently low to provide the desired differential as aforesaid. The coefficient of expansion of the composition with 1% LiF when used on the same base body is about on the borderline between a satisfactory glaze and an unsatisfactory one, and is not a composition assuring good results. When, however, the amount of lithium fluoride is raised to 2%, the composition becomes wholly useless as a glaze on this base body, as it could not be put under compression, for the reason that it has the same coefficient of expansion as the base body.

In contrast with this, the compositions wherein both 1% and 2% lithium fluosilicate are used in accordance with the present invention, in both instances have the coefficient of thermal expansion sufficiently low, so that the desired results are obtained from the point of view of thermal expansion and compression state in the finished product when used on this base body.

In addition to this, the compositions including lithium fluosilicate formulated as set out in this example give the other functional advantages herein alluded to.

From the above example, it is evident that the use of lithium fluosilicate is markedly superior to the use of lithium fluoride, even in compositions including a substantial amount of silicate.

Example 2

The purpose of this example is to demonstrate the superiority of the use of lithium fluosilicate with respect to the use of equivalent amounts of lithium, fluorine and silicon supplied in other ways. The composition in this case is one of a cone 3–4 glaze, such as might be used on earthenware, tile or other white wares.

The base composition in each instance in this example is as follows:

| Oxide Ingredient | Empirical Molecular Formula | Weight Proportion, percent |
|---|---|---|
| $Li_2O$ | 0.10 | 0.94 |
| $K_2O$ | 0.12 | 3.57 |
| $Na_2O$ | 0.06 | 1.18 |
| $PbO$ | 0.23 | 16.23 |
| $CaO$ | 0.38 | 6.74 |
| $ZnO$ | 0.11 | 2.83 |
| $Al_2O_3$ | 0.27 | 8.70 |
| $B_2O_3$ | 0.31 | 6.83 |
| $SiO_2$ | 2.60 | 49.37 |
| $F_2$ | 0.30 | 3.61 |

The lithium and fluorine given in the above formulation and some of the silicon were supplied in the following ways in three different compositions prepared for comparison purposes in this example. In composition (a) 0.1 mol equivalent of $Li_2SiF_6$ was supplied. In composition (b) there was supplied separately 0.2 mol equivalent of LiF, 0.1 mol equivalent of $SiO_2$, and 0.3 mol equivalent of $CaF_2$. In composition (c) there was supplied 0.1 mol equivalent of $Li_2CO_3$, 0.1 mol equivalent of $SiO_2$, and 0.3 mol equivalent of $CaF_2$. Thus it will be seen that compositions (a) is one according to the present invention, while compositions (b) and (c) represent prior art compositions, wherein the elements lithium and fluorine are supplied in some other form; while in all cases silica is present in ample amounts. It was found that the (c) modification showed most blebs and other glaze defects, both in sub-maturing and maturing temperatures. The (a) modification according to the present invention was best in all respects and had a maturing temperature of about 45° F. lower than that required for the (c) composition; had a lower viscosity and in general a superior appearance. The (b) composition was intermediate (a) and (c), but was definitely inferior to the (a) composition in all points mentioned.

These compositions were tried with the lithium constituents applied both as frit additions and as mill additions, although the frit addition mode of supplying the lithium constituent is presently preferred in view of the substantial water solubility of lithium fluosilicate.

Example 3

The purpose of this example is to illustrate the comparative effects of the use of lithium fluosilicate according to the present invention with other alkali fluosilicate, for example, sodium fluosilicate ($Na_2SiF_6$). In accordance with the tests forming the basis of this example two compositions were made which are identical with the exception that in one, lithium fluosilicate is used, while in the other the same weight percentage of sodium fluosilicate is used. The compositions (given in weight percent) are as follows:

| Materials | (a) | (b) |
|---|---|---|
| | Percent | Percent |
| $Li_2SiF_6$ | 0.48 | |
| $Na_2SiF_6$ | | 0.48 |
| $K_2O$ | 3.04 | 3.04 |
| $Na_2O$ | 2.40 | 2.40 |
| $CaO$ | 7.61 | 7.61 |
| $SrO$ | 3.34 | 3.34 |
| $MgO$ | 1.30 | 1.30 |
| $ZnO$ | 2.89 | 2.89 |
| $Al_2O_3$ | 11.51 | 11.51 |
| $B_2O_3$ | 5.39 | 5.39 |
| $SiO_2$ | 62.04 | 62.04 |
| | 100.00 | 100.00 |

It was found that composition (a) according to the present invention has a substantially lower maturing temperature than composition (b) including the sodium fluosilicate. While both fluosilicates tend to reduce the maturing temperatures, the lithium fluosilicate is effective to reduce such maturation temperatures about two or three times as much as an equivalent amount by weight of sodium fluosilicate. Furthermore, microscopic examination of the two glazes on the finished products definitely showed a much lower bleb count and much smaller number of microscopic defects in the glaze (a) containing lithium fluosilicate than in the glaze (b) containing the corresponding sodium compound.

Example 4

The purpose of this example is to set out typical compositions, all within the present invention, illustrating the claimed limits for the use of lithium fluosilicate set out in the present invention, all the ingredients, with the exception of the lithium fluosilicate, being merely illustrative and not being intended as limiting upon the particular percentages of such other ingredients which may be used according to this invention, either in amount or in the kinds of such materials as equivalents of many of these materials will be obvious to those skilled in the art either from their general knowledge or from other generally descriptive portions of this disclosure. These compositions are set forth in the table which follows:

| | Extreme Limits, percent | | Preferred Limits, percent | | Typical Compositions, percent |
|---|---|---|---|---|---|
| $Li_2SiF_6$ | 0.50 | 5.00 | 1.50 | 3.00 | 2.50 |
| $K_2O$ | 3.03 | 2.90 | 3.00 | 2.96 | 2.97 |
| $Na_2O$ | 2.41 | 2.30 | 2.38 | 2.35 | 2.36 |
| $CaO$ | 7.60 | 7.26 | 7.53 | 7.41 | 7.45 |
| $SrO$ | 3.34 | 3.19 | 3.31 | 3.26 | 3.28 |
| $MgO$ | 1.29 | 1.24 | 1.28 | 1.26 | 1.27 |
| $ZnO$ | 2.89 | 2.76 | 2.86 | 2.81 | 2.83 |
| $Al_2O_3$ | 11.51 | 10.99 | 11.40 | 11.22 | 11.28 |
| $B_2O_3$ | 5.39 | 5.15 | 5.34 | 5.26 | 5.28 |
| $SiO_2$ | 62.04 | 59.21 | 61.40 | 60.47 | 60.78 |
| | 100.00 | 100.00 | 100.00 | 100.00 | 100.00 |

Example 5

The purpose of this example is to illustrate the application of the present invention to enamel compositions and particularly to present a comparison between a composition according to the present invention usable as a cover coat of enamel to coat a ground coat, which in turn coats sheet steel. The compositions of the base enamel, a composition (A) according to the prior art including lithium oxide ($Li_2O$)—introduced originally as lithium carbonate—and a composition (B) according to the present invention is given in the following table (all percentages given being by weight).

| Material | Base Enamel | A | B |
|---|---|---|---|
| | Percent | Percent | Percent |
| $Na_2O$ | 11 | 8 | 8 |
| $K_2O$ | 3 | 3 | 3 |
| $Li_2O$ | — | 3 | — |
| $Li_2SiF_6$ | — | — | 3 |
| $CaF_2$ | 5 | 5 | 5 |
| $Na_3AlF_6$ | 11 | 11 | 11 |
| $ZnO$ | 4 | 4 | 4 |
| $B_2O_3$ | 10 | 10 | 10 |
| $Al_2O_3$ | 4 | 4 | 4 |
| $SiO_2$ | 44 | 44 | 44 |
| $NaSbO_3$ | 8 | 8 | 8 |
| | 100 | 100 | 100 |

It was further found that although the substitution or replacement of some of the $Na_2O$ of the base enamel formula by $Li_2O$, as in composition (A) above, resulted in increased fusibility and improved gloss as contrasted with said base enamel, it was found that this increased fusibility at a given temperature tended toward reduced opacity, apparently due to the growth of large fluoride crystals. This effect was noted increasingly with larger replacement of $Li_2O$ for $Na_2O$ on a weight for weight basis. With the composition of the present invention (composition (B) above), replacing the $Li_2O$ of composition (A) and replacing some of the $Na_2O$ of the base enamel composition, there was the desired increased fusibility and higher gloss without, however, the undesired loss in opacity. It was also found that this novel composition gave lower maturing temperatures than those of otherwise the same general type of prior art compositions.

*Example 6*

This example illustrates, by a comparison similar to that given in Example 5, the effect of the composition of the present invention including lithium fluosilicate as contrasted with the same amount of lithium oxide (introduced as the carbonate) in a composition wherein the opacity is secured to a substantial extent at least by the presence of titania. The several compositions are given here under the heading base enamel and as compositions (C) and (D) respectively; and are given in terms of weight percent in each instance.

| Material | Base Enamel | C | D |
|---|---|---|---|
| | Percent | Percent | Percent |
| $Na_2O$ | 8 | 5 | 5 |
| $K_2O$ | 2 | 2 | 2 |
| $Li_2O$ | — | 3 | — |
| $Li_2SiF_6$ | — | — | 3 |
| $CaO$ | 1 | 1 | 1 |
| $MgO$ | 2 | 2 | 2 |
| $ZnO$ | 1 | 1 | 1 |
| $Al_2O_3$ | 1 | 1 | 1 |
| $B_2O_3$ | 15 | 15 | 15 |
| $SiO_2$ | 55 | 55 | 55 |
| $TiO_2$ | 15 | 15 | 15 |
| | 100 | 100 | 100 |

When these compositions were made and tested it was found that the substitution of some $Li_2O$ for an equivalent weight of $Na_2O$ provided some increased fluidity for the composition. In other words, composition (C) had a greater fluidity at a given elevated temperature than the base enamel composition. It was found, however, that when a composition according to the present invention (composition (D) were given) was used in which the same percentage by weight of lithium fluosilicate was substituted for a part of the $Na_2O$ corresponding exactly to that weight proportion represented by lithium oxide in composition (C), that there was substantially greater reflectance. Furthermore, when a colored enameled article is to be made (other than white), the composition (D) according to the present invention gives a much superior color with the same amount of the same inorganic pigment present therein and seems actually to enhance the color given by such pigment. In other words, in the prior art it was practically feasible to get pastel-type colors only in enamels of this general character, i.e. those containing a substantial amount of titania. With the present invention, however, substantially deeper and more intense shades are possible and easily obtainable.

*Example 7*

This example is to illustrate the comparison of a base enamel, which in this instance contains $Li_2O$ on the one hand, with a composition containing an equivalent amount by weight of lithium fluosilicate. The composition in this instance is a low temperature enamel intended for use on light metals, for instance, aluminum. The compositions of the base enamel and/or of the modification here designated (E) (according to the present invention) are given in the following table.

| Material | Base Enamel | (E) |
|---|---|---|
| | Percent | Percent |
| $Na_2O$ | 10 | 10 |
| $K_2O$ | 3 | 3 |
| $Li_2O$ | 5 | — |
| $Li_2SiF_6$ | — | 5 |
| $CaO$ | 2 | 2 |
| $PbO$ | 40 | 40 |
| $SiO_2$ | 30 | 30 |
| $TiO_2$ | 6 | 6 |
| $ZrO_2$ | 4 | 4 |
| | 100 | 100 |

In this instance it was found that the enamel according to composition (E) above not only had increased fluidity at a given elevated temperature with respect to the so-called base enamel above; but also had substantially better surface characteristics, as well as desired values of thermal expansion, high chemical resistance, high surface hardness and a minimum of surface flaws, even when examined under the microscope.

In describing the present invention, equivalents where they are known have been described as far as possible as the description has proceeded. It is recognized that other equivalents will suggest themselves to those skilled in the art from the foregoing particular disclosure. I do not wish to be limited, therefore, except by the scope of the appended claims, which are to be construed validly as broadly as the state of the art permits.

What is claimed is:

1. A composition useful as glazes and vitreous enamels, comprising (a) a material capable of itself forming a glass and being at least one material selected from the group consisting of $SiO_2$, $B_2O_3$, $As_2O_5$, $As_2O_3$, $BeO_3$, $Bi_2O_3$, $GeO_2$, $P_2O_5$, $Sb_2O_5$, $Sb_2O_3$, $Ta_2O_5$, and $V_2O_5$; (b) at least one network modifier selected from the group consisting of $Me'_2O$ and $Me''O$ wherein Me' is a metal selected from the group consisting of K, Na, Li, Rb and Cs and wherein Me" is a metal selected from the group consisting of Ca, Sr, Ba, Mg, Mn, Pb and Zn; and (c) the compound $Li_2SiF_6$ introduced as such in an amount from about ½% to about 5% by weight based on the total weight of the oxides present.

2. A composition in accordance with claim 1, in which the amount of the compound $Li_2SiF_6$ is from about 1½% to about 3% by weight of the total weight of the oxides present.

3. A composition in accordance with claim 1, in which the amount of the compound $Li_2SiF_6$ is about 2½% by weight of the total weight of the oxides present.

4. The method of forming glazes and enamels having low maturing temperatures, a low coefficient of expansion and having a minimum of surface defects and high brilliance, comprising the steps of adding from about ½% to about 5% of the compound $Li_2SiF_6$ to a basic composition usable in making glazes and enamels and comprising (a) a material capable of itself forming a glass and being at least one material selected from the group consisting of $SiO_2$, $B_2O_3$, $As_2O_5$, $As_2O_3$, $BeO_3$, $Bi_2O_3$, $GeO_2$, $P_2O_5$, $Sb_2O_5$, $Sb_2O_3$, $Ta_2O_5$, and $V_2O_5$; (b) at least one network modifier selected from the group consisting of $Me'_2O$ and $Me''O$ wherein $Me'$ is a metal selected from the group consisting of K, Na, Li, Rb and Cs and wherein $Me''$ is a metal selected from the group consisting of Ca, Sr, Ba, Mg, Mn, Pb and Zn.

5. The method in accordance with claim 4 in which the amount of the compound $Li_2SiF_6$ added as aforesaid is from about 1½% to about 3%.

6. The method in accordance with claim 4 in which the amount of the compound $Li_2SiF_6$ added as aforesaid is about 2½%.

7. A glazed ceramic article consisting of a ceramic body coated by an adherent layer of glaze, said body having a predetermined coefficient of expansion and said layer of glaze having a coefficient of expansion lower than that of said body and comprising (a) a material capable of itself forming a glass and being at least one material selected from the group consisting of $SiO_2$, $B_2O_3$, $As_2O_5$, $As_2O_3$, $BeO_3$, $Bi_2O_3$, $GeO_2$, $P_2O_5$, $Sb_2O_5$, $Sb_2O_3$, $Ta_2O_5$, and $V_2O_5$; (b) at least one network modifier selected from the group consisting of $Me'_2O$ and $Me''O$ wherein $Me'$ is a metal selected from the group consisting of K, Na, Li, Rb and Cs and wherein $Me''$ is a metal selected from the group consisting of Ca, Sr, Ba, Mg, Mn, Pb and Zn; and (c) the compound $Li_2SiF_6$ introduced as such in an amount from about ½% to about 5% by weight based on the total weight of the oxides present.

8. A glazed ceramic article in accordance with claim 7, in which the amount of the compound $Li_2SiF_6$ is from about 1½ to about 3%.

9. A glazed ceramic article in accordance with claim 7, in which the amount of the compound $Li_2SiF_6$ is about 2½%.

10. An enameled metallic body consisting of a base of metal upon which is applied at least one coat of ceramic material fused in place, and wherein the outer one of said coats comprises (a) a material capable of itself forming a glass and being at least one material selected from the group consisting of $SiO_2$, $B_2O_3$, $As_2O_5$, $As_2O_3$, $BeO_3$, $Bi_2O_3$, $GeO_2$, $P_2O_5$, $Sb_2O_5$, $Sb_2O_3$, $Ta_2O_5$, and $V_2O_5$; (b) at least one network modifier selected from the group consisting of $Me'_2O$ and $Me''O$ wherein $Me'$ is a metal selected from the group consisting of K, Na, Li, Rb and Cs and wherein $Me''$ is a metal selected from the group consisting of Ca, Sr, Ba, Mg, Mn, Pb and Zn; and (c) the compound $Li_2SiF_6$ introduced as such in an amount from about ½% to about 5% by weight based on the total weight of the oxides present.

11. An enameled metallic body in accordance with claim 10, in which the amount of the compound $Li_2SiF_6$ present in the outer one of said coats is from about 1½% to about 3% by weight based on the total weight of the oxides present in this outer coat.

12. An enameled metallic body in accordance with claim 10, in which the amount of the compound $Li_2SiF_6$ present in the outer one of said coats is about 2½% based on the total weight of the oxides present in this outer coat.

References Cited in the file of this patent

UNITED STATES PATENTS

| | | |
|---|---|---|
| 2,840,482 | Knapp et al. | June 24, 1958 |
| 2,898,218 | Voss et al. | Aug. 4, 1959 |
| 2,918,383 | Strimple | Dec. 22, 1959 |

OTHER REFERENCES

Rao: Alkali-fluoro-silicate Glasses as Vitreous Enamels for Aluminum, Finish Vol. 10, #5, May 1953, pp. 31–33, 72, 73.